March 14, 1933.    P. H. STANLEY    1,901,132
ROTARY WINGED AIRCRAFT
Filed March 12, 1932
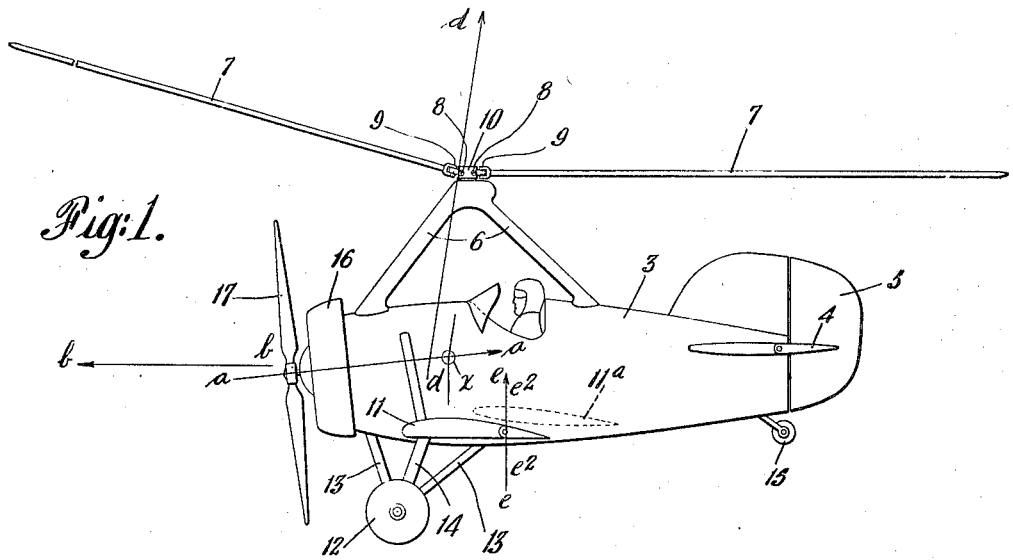
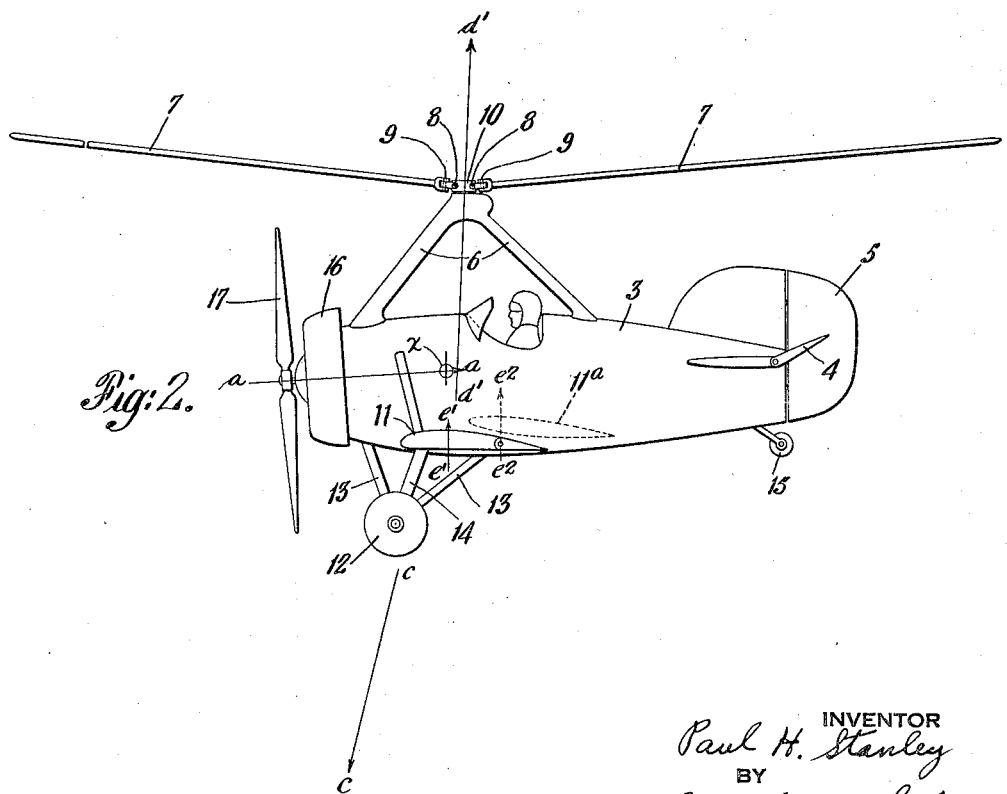
INVENTOR
Paul H. Stanley
BY
Symestvedt + Lechner
ATTORNEYS Patented Mar. 14, 1933

1,901,132

UNITED STATES PATENT OFFICE

PAUL H. STANLEY, OF GLENSIDE, PENNSYLVANIA, ASSIGNOR TO AUTOGIRO COMPANY OF AMERICA, OF PHILADELPHIA, PENNSYLVANIA, A CORPORATION OF DELAWARE

ROTARY-WINGED AIRCRAFT

Application filed March 12, 1932. Serial No. 598,328.

This invention relates to rotary-winged aircraft and is particularly concerned with the construction of a craft which has, as its primary means of sustention, a system of pivotally and rotatively mounted sustaining wings or blades and, as a supplemental means of sustention, an additional and normally fixed sustaining wing system.

Generally considered, the present invention has in view improving the longitudinal stability, balance and controllability of a craft of the character above referred to.

More specifically, the invention contemplates a novel relation between the rotary and normally fixed lifting surfaces of a craft of the character here involved so as automatically to counteract shift in the position of the lift line of the rotor which results from changes in the angle and/or attitude of flight of the craft.

The invention also attains the foregoing objects and advantages and at the same time simplifies the general construction of the craft, as will appear more fully hereinafter.

In addition to the foregoing, the invention contemplates a novel arrangement of the primary and supplemental lifting systems in relation to the forward propulsion means with which the craft is equipped. In accordance with the arrangement of this invention, the line of thrust of the propelling means is so disposed as not to interfere with the automatic action above referred to which counteracts or compensates for shift in the line of lift of the rotor as between different attitudes of flight.

How the foregoing objects and advantages are obtained will be more apparent from a consideration of the following description making reference to the accompanying drawing, in which Figure 1 is a somewhat diagrammatic side view of an aircraft of the type here involved, the said craft incorporating features of this invention and being shown in high speed forward flight; and Figure 2 is a view similar to Figure 1 but illustrating the craft in making a relatively steep descent.

As will be seen from inspection of the two figures, the body or fuselage of the craft is designated by the numeral 3 and the center of gravity of the craft as a whole is shown at $x$. Toward the rear of the fuselage, suitable empennage surfaces, at least including an elevator 4 and a rudder 5, are provided.

The rotor system is mounted generally above the center of gravity of the craft as by means of the pylon or supporting elements 6, the rotor including a plurality of wings or blades 7 each individually articulated by means of horizontal and vertical pivot pins 8 and 9 to a common central axis member 10, the whole being arranged for normally free actuation under the influence of relative air flow.

Supplemental sustaining surfaces such as indicated at 11 are also provided and preferably extended at each side of the body of the craft. Suitable landing elements, such as wheels 12, are preferably arranged below the body and braced thereto by means of the struts 13. The landing wheels are also braced to the fixed surfaces 11 as, for example, by means of shock absorbers 14. A tail wheel 15 may also be employed.

The propelling means for the craft includes an engine diagrammatically shown at 16 and a propeller 17. While the engine and propeller are located slightly below the center of gravity of the craft as a whole, the thrust line $a—a$ thereof is preferably tilted slightly so that it passes through or approximately through the center of gravity.

In rotary-winged aircraft of the type herein disclosed, during rotation of the blades of the rotor, they swing upwardly and downwardly under the influence of flight forces, and since their swinging movements vary between high speed forward flight and steep descent of the craft, under the first condition of flight the blades follow one general rotative path and, under the other condition of flight the blades follow a somewhat different general rotary path. Specifically, in relatively high speed forward flight (see flight line $b—b$ in Figure 1), the blades are coned upwardly substantially when they are in forward position, and extend approximately at right angles to the axis of the rotor when they are in rearward position. When making relatively steep descent, as indicated for example by the flight line $c$—$c$ in Figure 2, the blades cone up substantially equally in all positions. The result of this difference in "coning" of the blades is that the lift line of the rotor extends at different angles to the axis thereof.

In accordance with this invention, the rotor is so positioned with respect to the center of gravity of the craft as a whole that, in high speed forward flight (see Figure 1), the lift line $d$—$d$ passes forwardly of the center of gravity $x$, and that, in steep descent (see Figure 2), the lift line $d'$—$d'$ passes rearwardly of the center of gravity $x$. This arrangement ensures that, in making steep or substantially vertical descent, there will be an automatic tendency for the craft to assume a small forward gliding angle. If it is desired to effect substantially true vertical descent, for example, in still air, the tendency to assume a gliding angle may be at least partially counteracted by upward displacement of the elevator 4 as suggested in Figure 2, since such surface is subject to the downwash from the rotor.

Turning now to the supplemental fixed lifting wings, it should be observed that, in accordance with this invention, the wing section employed is asymmetrically cambered on its upper and lower sides, so that the center of pressure (and lift line thereof) shifts to different positions in accordance with the angle of attack of the wing in the air. Specifically, the wing section is such that, in relatively low or small angles of attack (i. e., the angle for high speed forward flight of the craft, as shown in Figure 1), the center of pressure is located at a point about sixty per cent. of the chord length rearwardly from the leading edge. By way of example, the foregoing may be accomplished by use of a fixed wing of Gottingen 413 section. With such a wing positioned longitudinally of the craft, as shown in Figure 1, the lift line $e$—$e$ passes the center of gravity $x$ at a considerable distance to the rear thereof, the result being that, in high speed forward flight, the rearward travel of the lift line of the fixed wing counteracts the forward travel of the lift line of the rotor, so that longitudinal stability, balance and controllability are improved. In this connection it should be understood that, in the preferred arrangement, the fixed wing has a total lift equal to only a fraction of the lift of the rotor. However, the arrangement is such that the rearward travel of the lift line of the fixed wing is greater than the forward travel of the lift line of the rotor, both with respect to the center of gravity $x$, so that the proper stability and balance are provided, since the moments produced by the lift lines $d$—$d$ and $e$—$e$ are determined by the magnitude of the lift forces as well as by their displacement with relation to the center of gravity $x$.

In effecting a relatively steep decent (see Figure 2) the high angle of attack of the fixed wing 11 results in forward displacement of its lift line, and the arrangement is preferably such that, under these circumstances, the lift line $e'$—$e'$ passes approximately through the center of gravity $x$. In addition, it might be noted that, in high angles of attack, the sustaining force of the fixed wing is reduced to a very small value, the rotor, at this time, taking substantially the entire load.

In accordance with the foregoing, therefore, the present invention provides a fixed wing structure of such aerofoil section and so positioned on the craft as to compensate for forward travel of the lift line of the rotor in high speed forward flight, and yet to maintain a desirably balanced or stabilized condition for steep or even vertical descent.

The improvement resulting from the use of the present invention will be still more apparent from comparison with the arrangement of prior practice. In such prior practice, a fixed wing of substantially fixed center of pressure, for example, of symmetrically cambered section, was employed and positioned on the craft as suggested in dotted lines at 11$a$ in the drawing. With this type of wing, the center of pressure and the lift line are located only a short distance from the leading edge (about twenty-five per cent. of the chord length), and in order that such a wing should compensate for the forward travel of the lift line of the rotor in high speed forward flight of the craft, the wing was disposed well rearwardly of the center of gravity, as shown in the drawing, so that its lift line would pass the center of gravity well to the rear thereof (see lift line $e^2$—$e^2$ coinciding with lift line $e$—$e$ of wing 11 in Figure 1). However, in view of the fact that the center of pressure of such a wing does not move substantially in different angles of attack, the line $e^2$—$e^2$ still passed rearwardly of the center of gravity in steep descent. Furthermore, even though the lift of the fixed wing is relatively small during relatively steep descent, it materially affected the longitudinal balance of the craft for the reason that the line $e^2$—$e^2$ passed the center of gravity at a considerable distance therefrom.

Particular attention is called to the fact that, in accordance with this invention, since the lift line of the fixed wing travels forwardly as the angle of descent increases, the center of gravity of the craft as a whole need not be accurately located in order to obtain good longitudinal stability and control. That is, the movable or disposable load of the craft, such as fuel, baggage and weight of occupants, may be altered between relatively wide limits, without materially affecting longitudinal stability or control even in vertical descent. Indeed, it has been found that proper stability may be maintained even where the center of gravity is moved throughout a range thirty per cent. greater than the range permissible, while maintaining good balance, in prior arrangements.

It will be apparent that a considerable advantage is gained by this invention by its reduction of unbalanced longitudinal moments in various attitudes of flight, which heretofore have imposed considerable loads on the elevator resulting in increasing the work of the pilot and loss of flight efficiency.

An additional advantageous feature of the present invention resides in the fact that the landing gear, even though it is located well forwardly on the body of the craft, may conveniently and effectively be connected, as by means of shock absorbers 14, to the fixed wings, it being noted that these wings are also positioned well forwardly on the body as compared to prior practice. This is of importance since, in aircraft of the type here under consideration, it is desirable to employ a relatively wide tread under-carriage. The construction of such wide tread landing gear is facilitated where the fixed wings are disposed well forwardly on the body, as will readily be apparent from inspection of the drawing.

The present invention, therefore, provides improved longitudinal stability and controllability, it being noted that the forward propulsion means is additionally arranged so that the proper balance is not disturbed whether a descent is made with engine on or with engine off.

I claim:—

1. An aircraft including a system of pivotally and rotatively mounted sustaining blades or wings mounted above the body thereof, and a supplemental normally fixed lifting surface of contour or section providing for a shift in the lift line thereof as between different angles of attack, said surface being so mounted on the craft that the lift line thereof passes upwardly to the rear of the center of gravity of the craft as a whole, at least in relatively high speed forward flight.

2. In combination in an aircraft, a rotative sustaining system having a forwardly traveling positive effective lift line with increasing forward speed of the craft, and a fixed wing sustaining system having a rearwardly traveling positive effective lift line with increasing forward speed of the craft.

3. An aircraft including a system of pivotally and rotatively mounted sustaining wings or blades mounted generally above the center of gravity of the craft as a whole, in which construction the lift line of the rotor is forwardly disposed in high speed forward flight as compared to the position thereof in steep descent, forward propelling means for the craft including a propeller so mounted that the thrust line thereof passes approximately through the center of gravity of the craft as a whole, and a supplemental normally fixed lifting surface of contour or section providing for a shift in the lift line thereof as between different angles of attack, said surface being so mounted on the craft that the lift line thereof passes upwardly to the rear of the center of gravity of the craft as a whole, at least in relatively high speed forward flight.

4. In an aircraft, a primary sustaining system of normally air rotated wings, flexible mounting means for said wings whereby they may swing under varying flight forces particularly as between forward flight and steep descent, relatively fixed sustaining surfaces of such area as compared with the rotative system as to produce even in high speed forward flight a lift equal only to a fraction of the lift produced by the rotative system, means securing the rotative system on the craft in such manner that the lift line of said system passes close to the normal location of the center of gravity of the craft in steep descent and the flexible mounting of the wings being such as to effect a displacement of the lift line of the primary sustaining system forwardly of the center of gravity in high speed forward flight, the fixed sustaining surfaces being so positioned that in steep descent their lift line passes close to the said center of gravity, said fixed surfaces being of such a contour that their lift line moves rearwardly of the said center of gravity in high speed forward flight a distance greater than the forward displacement of the lift line of the rotative system, whereby the moments of the rotative and fixed wings, with respect to the center of gravity, approximately balance each other.

5. In an aircraft, a primary sustaining system of normally air rotated wings, flexible mounting means for said wings whereby they may swing under varying flight forces particularly as between forward flight and steep descent, relatively fixed sustaining surfaces of such area as compared with the rotative system as to produce even in high speed forward flight a lift equal only to a fraction of the lift produced by the rotative system, means securing the rotative system on the craft in such manner that the lift line of said system passes close to the normal location of the center of gravity of the craft in steep descent and the flexible mounting of the wings being such as to effect a displacement of the lift line of the primary sustaining system forwardly of the center of gravity in high speed forward flight, the fixed sustaining surfaces being so positioned that in steep descent their lift line passes close to the said center of gravity, said fixed surfaces being of such a contour that their lift line moves rearwardly of the said center of gravity in high speed forward flight a distance greater than the forward displacement of the lift line of the rotative system, whereby the moments of the rotative and fixed wings, with respect to the center of gravity, approximately balance each other, and forward propulsion means arranged with its thrust line intersecting a transverse line through the center of gravity of the craft, whereby with the propulsion means in or out of operation said means produces no disturbance of the balance and stability effected by the rotary and fixed sustaining surfaces.

6. An aircraft including a sustaining rotor of the pivoted blade type mounted above the body thereof in position to provide for passage of its lift line, in high speed forward flight, in front of the center of gravity of the craft as a whole, and, in relatively steep descent, slightly to the rear of the normal location of the center of gravity a supplemental normally fixed lifting surface of such contour or section as to provide for center of pressure travel forwardly as its aerodynamic angle of attack increases, said surface being so positioned on the craft with respect to said center of gravity that, in high speed forward flight, the lift line thereof passes upwardly to the rear of the center of gravity.

7. An aircraft including a sustaining rotor of the pivoted blade type mounted above the body thereof in position to provide for passage of its lift line, in high speed forward flight, in front of the center of gravity of the craft as a whole, and, in relatively steep descent, slightly to the rear of the normal location of the center of gravity, a supplemental normally fixed lifting surface of such contour or section as to provide for center of pressure travel forwardly as its aerodynamic angle of attack increases, said surface being so positioned on the craft with respect to said center of gravity that, in high speed forward flight, the lift line thereof passes upwardly to the rear of the center of gravity, and in relatively steep descent, the lift line passes upwardly approximately through said center of gravity.

8. An aircraft including a sustaining rotor of the pivoted blade type mounted above the body thereof in position to provide for passage of its lift line, in high speed forward flight, in front of the center of gravity of the craft as a whole, and, in relatively steep descent, slightly to the rear of the normal location of the center of gravity, forward propelling means for the craft including a propeller so mounted that the thrust line thereof passes approximately through the center of gravity of the craft as a whole, a supplemental normally fixed lifting surface of such contour or section as to provide for center of pressure travel forwardly as its aerodynamic angle of attack increases, said surface being so positioned on the craft with respect to said center of gravity that, in high speed forward flight, the lift thereof passes upwardly to the rear of the center of gravity.

9. An aircraft including a sustaining rotor of the pivoted blade type mounted above the body thereof in position to provide for passage of its lift line, in high speed forward flight, in front of the center of gravity of the craft as a whole, and, in relatively steep descent, slightly to the rear of the normal location of the center of gravity, forward propelling means for the craft including a propeller so mounted that the thrust line thereof passes approximately through the center of gravity of the craft as a whole, a supplemental normally fixed lifting surface of such contour, or section as to provide for center of pressure travel forwardly as its aerodynamic angle of attack increases, said surface being so positioned on the craft with respect to said center of gravity that, in high speed forward flight, the lift line thereof passes upwardly to the rear of the center of gravity, and in relatively steep descent, the lift line passes upwardly approximately through said center of gravity.

10. An aircraft including a normally air actuated sustaining rotor positioned above the body of the craft so that, in high speed forward flight the lift line of the rotor passes in front of the center of gravity of the craft as a whole, and a supplemental normally fixed lifting aerofoil asymmetrically cambered to provide for location of its center of pressure in different positions in different aerodynamic angles of attack, said aerofoil being positioned on the craft so that in high speed forward flight and relatively low angle of attack the lift line thereof passes to the rear of said center of gravity.

11. An aircraft including a normally air actuated sustaining rotor positioned above the body of the craft so that, in high speed forward flight, the lift line of the rotor passes in front of the center of gravity of the craft as a whole, and a supplemental normally fixed lifting aerofoil asymmetrically cambered to provide for location of its center of pressure in different positions in different aerodynamic angles of attack, said aerofoil being positioned on the craft so that in high speed forward flight and relatively low angle of attack the lift line thereof passes to the rear of the said center of gravity, and the aerofoil further being positioned so that, in relatively steep descent and high angle of attack, the lift line passes approximately through the said center of gravity.

In testimony whereof I have hereunto signed my name.

PAUL H. STANLEY.